United States Patent [19]

Drawert

[11] Patent Number: 5,111,490

[45] Date of Patent: May 5, 1992

[54] METHOD AND APPARATUS FOR COLLECTING VIDEO FRAMES, LINES AND PIXELS

[75] Inventor: Bruce M. Drawert, Vernon Hills, Ill.

[73] Assignee: Kaibushiki Kaisha Toshiba, Kanagawa, Japan

[21] Appl. No.: 593,861

[22] Filed: Oct. 5, 1990

[51] Int. Cl.$^5$ ............................................. H04N 5/32
[52] U.S. Cl. ...................................... 378/4; 378/901; 378/99; 358/111; 358/183
[58] Field of Search ................ 358/111, 140, 148, 146, 358/137, 153, 154, 138, 183, 122, 182; 378/4, 99, 901

[56] References Cited

U.S. PATENT DOCUMENTS

| | | |
|---|---|---|
| 4,149,079 | 4/1979 | Ben-Zeev et al. |
| 4,280,178 | 7/1981 | Nassi et al. |
| 4,403,289 | 9/1983 | Lux et al. |
| 4,698,678 | 10/1987 | Collins ............................ 358/183 |
| 4,725,888 | 2/1988 | Hakamada ...................... 358/183 |
| 4,729,028 | 3/1988 | Micic et al. ..................... 358/183 |
| 4,750,038 | 6/1988 | Welles et al. ................... 358/183 |
| 4,855,813 | 8/1989 | Russell et al. .................. 358/183 |
| 4,881,124 | 11/1989 | Yokouchi et al. .............. 378/99 |
| 4,884,291 | 11/1989 | Nicolay .......................... 358/111 |

FOREIGN PATENT DOCUMENTS 1579265 11/1980 United Kingdom .

OTHER PUBLICATIONS

Chakraborty, "Image Intensifier Distortion Correction," Med. Phys. 14(2), (Mar./Apr. 1987).

Boone et al., "Analysis and Correction of Imperfections in the Image Intensifier TV-Digitizer Imaging Chain," 75th Annual Meeting of the Radiological Society of North America (Nov. 27, 1989, Chicago).

Primary Examiner—Janice A. Howell
Assistant Examiner—Kim-Kwok Chu
Attorney, Agent, or Firm—Finnegan, Henderson, Farabow, Garrett and Dunner

[57] ABSTRACT

A flexible video selector for use in various imaging systems including computed tomography (CT) imaging systems. A system operator inserts a number of video parameters identifying frames, lines and pixels of video information to be collected. A plurality of registers and counting devices are employed to control the video data selection. An A/D converter may be driven at intervals corresponding to the selected video information. In this manner, only video information corresponding to the selected pixels of the selected lines of the selected frame of video information are digitized for further processing. When implemented in a CT imaging system, the invention provides for x-ray dose control corresponding to the selected video parameters.

26 Claims, 5 Drawing Sheets

METHOD AND APPARATUS FOR COLLECTING VIDEO FRAMES, LINES AND PIXELS

BACKGROUND OF THE INVENTION

1. Field of the Invention

The present invention relates to a method and apparatus for selecting portions of a video signal for further processing, and more specifically, to a method and apparatus for selecting predetermined pixels, lines and frames of a video signal generated by an x-ray detector in a computed tomography (CT) imaging system.

2. Description of the Related Art

In a typical CT imaging system, a cone of x-rays are emitted by an x-ray source toward an object under test. An x-ray detector detects x-rays which pass through the object under test and generates an image frame of the detected x-ray pattern. This image frame is formatted into a video signal according to a number of conventional video formats, including NTSC, PAL and SECAM video formats. Using the NTSC format as an example, the image frame comprises 525 lines of video information, each line including, for example, 512 pixels of video information.

In an exemplary CT imaging system, an object under test is scanned for 60 seconds and 30 image frames are generated every second. These 1800 image frames are transformed by a CPU into a CT image of a slice of the object under test. Accordingly, each of the 1800 image frames of video information must be collected and digitized before being sent to the CPU for further processing.

Conventional devices for collecting image frames for digitization collect all lines of all 1800 image frames generated during the scanning period of the object under test. Digitizing this much video information is very expensive and can significantly increase the system processing time. Further, it is typically necessary to store the digitized data in a buffer memory before transferring the digitized data to the CPU system memory. These large amounts of data require large amounts of buffer memory, which further adds to the cost of the system.

Moreover, since conventional frame collectors collect and digitize every pixel of every line of every image frame generated during the scan, it is necessary to irradiate the object under test with x-rays during the entire scanning period, i.e. 60 seconds in this example. If the object under test is a human being or an animal, this x-ray dose can be very dangerous.

SUMMARY OF THE INVENTION

Accordingly, it is an object of the present invention to provide a method and apparatus for collecting only predetermined portions of a video signal.

It is another object of the present invention to provide a method and apparatus for selecting a predetermined number of pixels of a line of a frame of video information from a video signal.

It is another object of the present invention to provide a method and apparatus for selecting a predetermined number of lines from a frame of video information in a video signal.

It is another object of the present invention to provide a method and apparatus for selecting predetermined frames of video information in a video signal.

It is another object of the present invention to provide a method and apparatus for selecting a total predetermined number of frames of video information from a plurality of frames in a video signal.

It is another object of the present invention to provide a method and apparatus for controlling an x-ray dose generated during a scanning period in a CT imaging system.

Additional objects and advantages of the invention will be set forth in the description which follows, and in part will be apparent from the description, or may be learned by practice of the invention. The objects and advantages of the invention may be realized and obtained by means of the methods, instrumentalities and combinations particularly pointed out in the appended claims.

To achieve the foregoing objects, and in accordance with the purposes of the invention as embodied and broadly described herein, an apparatus is provided for collecting predetermined portions of a video signal, the video signal including a plurality of frames of video information comprised of a plurality of lines of pixels of video information, comprising: means for variably selecting a predetermined total number of said plurality of frames of video information; means for variably selecting predetermined ones of said plurality of frames of video information; means for variably selecting predetermined lines of each of said plurality of frames of video information; means for variably selecting a predetermined number of pixels from each line of video information; and means for collecting video information corresponding only to said predetermined pixels in said predetermined lines in said predetermined ones of said plurality of frames of video information until said predetermined total number of frames of video information have been collected.

To further achieve the foregoing objects, and in accordance with the purposes of the invention as embodied and broadly described herein, a computed tomography (CT) x-ray imaging system is provided, comprising: a device for variably selecting a portion of a video signal corresponding to an image frame of an object under test; and a device for irradiating the object under test with x-rays only at intervals of a scanning period corresponding to the variably selected portions of the video signal.

BRIEF DESCRIPTION OF THE DRAWINGS

The accompanying drawings, which are incorporated in and constitute a part of the specification, illustrate a presently preferred embodiment and method of the invention which, together with the general description given above and the detailed description of the preferred embodiment and method given below serve to explain the principles of the invention. Of the drawings.

DETAILED DESCRIPTION OF THE PREFERRED EMBODIMENT

Figure 1:
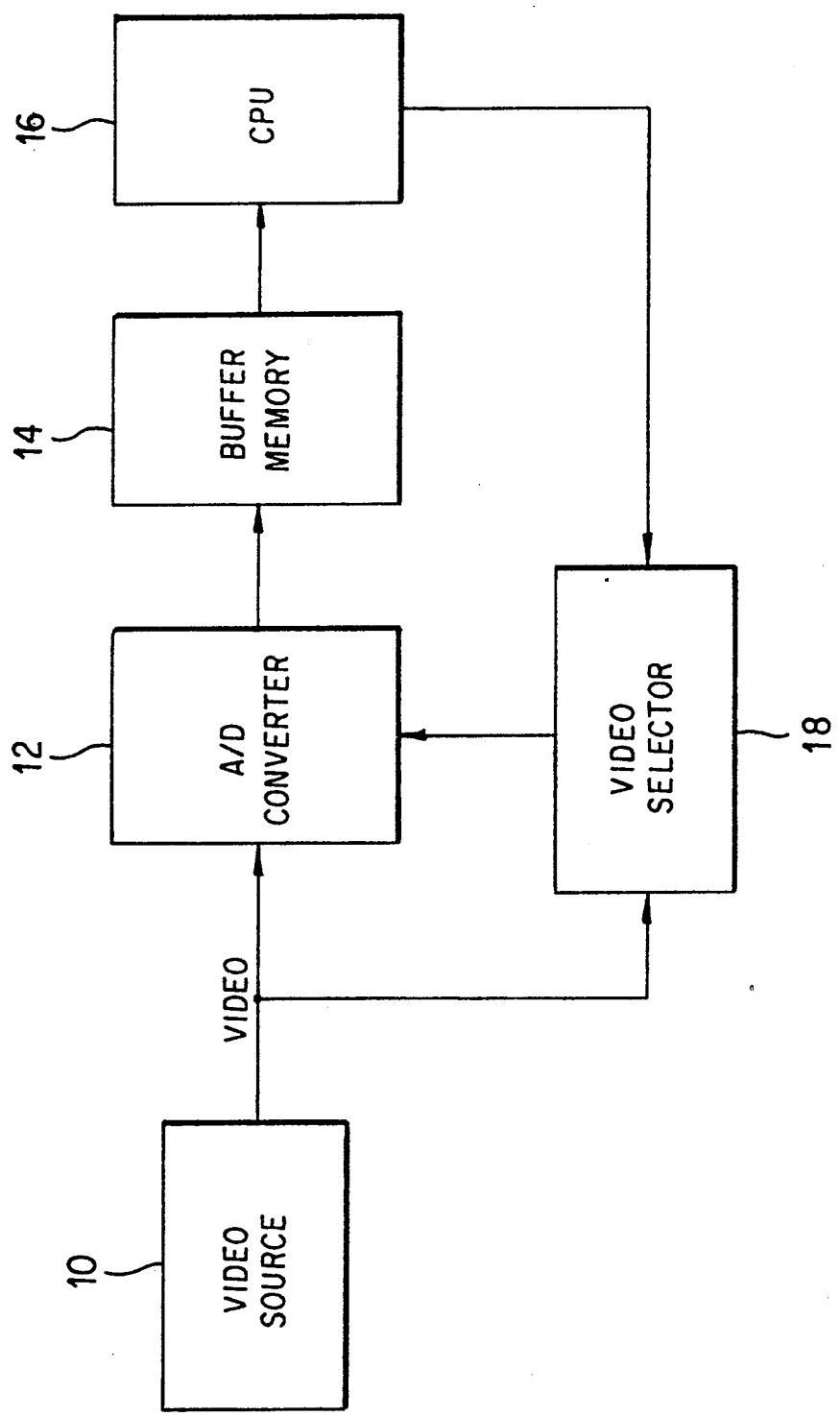
FIG. 1 represents a block diagram of a video system requiring a video selector in accordance with the present invention.

FIG. 1 shows a block diagram of a typical video system requiring a video selector in accordance with the present invention. The video system includes video source 10, A/D converter 12, buffer memory 14, CPU 16, and video selector 18. Buffer memory 14 may alternatively be provided in the CPU 16. Video selector 18 receives a video input from video source 10 and controls the conversion operation of A/D converter 12.

As embodied herein, video selector 18 selects the total number of frames of video information to be converted, the specific frames out of a plurality of frames of video information which will be converted, the number of lines in each frame to be converted and the number of pixels in each line of video information to be converted. Only this selected video information is converted to digital information by the A/D converter 12.

The digitized data is then packetized and transferred to buffer memory 14 for temporary storage before being forwarded to the CPU system memory (not shown).

Figure 2:
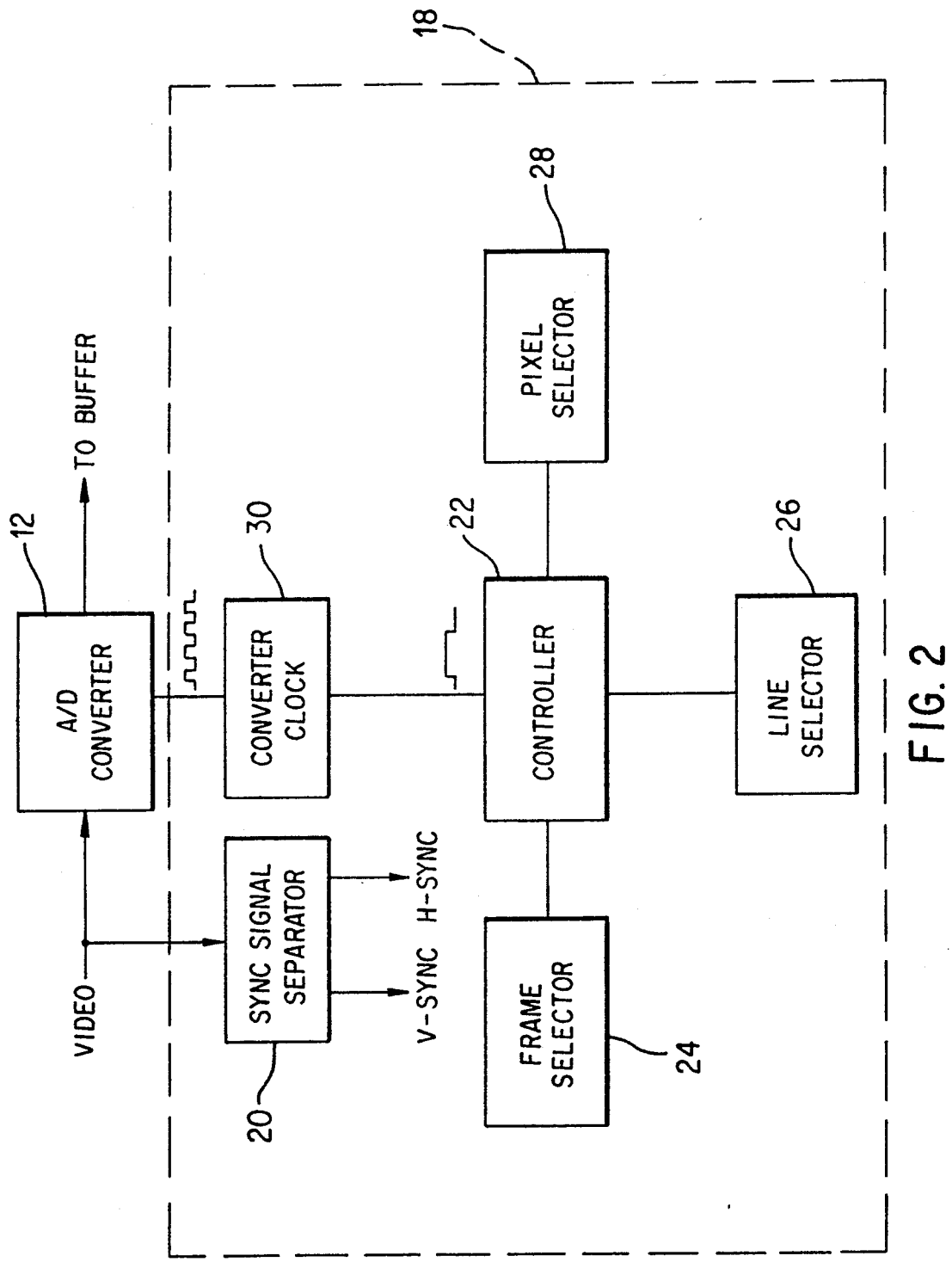
FIG. 2 is a detailed block diagram of a video selector in accordance with the present invention.

FIG. 2 shows a more detailed block diagram of the video selector 18.

As embodied herein, video selector 18, comprises sync signal separator 20, controller 22, frame selector 24, line selector 26, pixel selector 28 and converter clock 30.

Sync signal separator 20 receives the video signal and separates out the vertical synchronization signals V-sync and the horizontal synchronization signals H-sync. As will be described, these vertical and horizontal sync signals are used by the remaining components of the video selector 18 to synchronize the data collection operation with the input video signal.

Controller 22 receives enabling signals from frame selector 24, line selector 26 and pixel selector 28 identifying the frames, lines and pixels of video information to be collected and, in this implementation, digitized by the A/D converter 12. Controller 22 outputs a continuous signal which is converted to a pulse driving signal by converter clock 30 to drive A/D converter 12.

Figure 3:
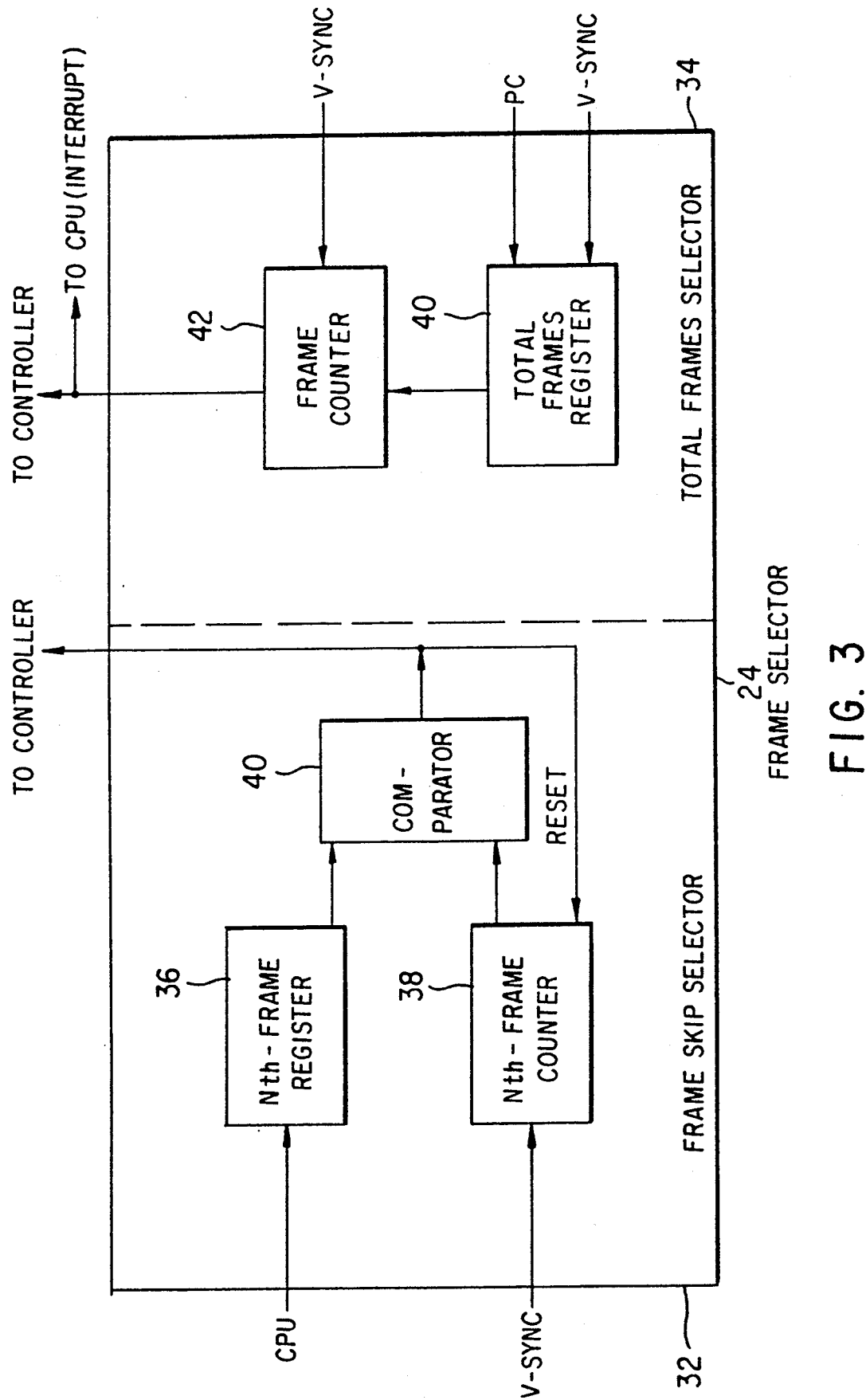
FIG. 3 is a detailed block diagram of a frame selector in accordance with the present invention.

In accordance with the present invention, means is provided for variably selecting predetermined ones of a plurality of frames of video information. As embodied herein, this means comprises frame skip selector 32 shown to the left of the dashed line in FIG. 3. Frame skip selector 32 comprises Nth frame register 36, Nth frame counter 38 and comparator 40. In operation, an operator loads the Nth frame register 36 through the CPU 16 with a value N corresponding to the number of frames which should be skipped between collected frames. For example, if the operator inputs a value five into the Nth frame register 36, the frame skip selector 32 will skip the first five frames of the video signal, select the next frame, skip another five frames, select the next frame, and so on.

The Nth frame counter 38 starts from zero and increments its value at the beginning of each V-sync pulse of each frame. The values in the Nth frame register 36 and the Nth frame counter 38 are then compared in comparator 40 at each V-sync pulse. If the values match, an output signal is sent to the controller 22 indicating that that frame is to be collected and the Nth frame counter 38 is reset to zero.

Also in accordance with the present invention, means is provided for variably selecting a predetermined total number of video frames from a plurality of video frames of video information. As embodied herein, this means comprises total frames selector 34, shown to the right of the dashed line in FIG. 3. The total number of frames selected is limited by the amount of computer memory available for data storage. To prevent data overflow corresponding to the amount of available data memory, an operator selects a total number of frames to be processed.

The total frames selector 34 comprises total frames register 40 and frame counter 42. An operator loads the total frames register 40 through the CPU 16 with a value corresponding to the number of desired total frames of video information. Frame counter 42 is loaded with this value at the beginning of an operating period and decrements its value at the beginning of each collected frame in response to a V-sync signal. When the frame counter 42 reaches zero, it produces an output signal to controller 22 which prevents the selection of data for digitization by the A/D converter 12. This output signal may also be used as an interrupt signal for the CPU 16 to stop the operating period.

Also in accordance with the present invention, means is provided for variably selecting predetermined lines of each of a plurality of frames of video information. As embodied herein, this means comprises line selector 26, which is shown in more detail in FIG. 4.

Figure 4:
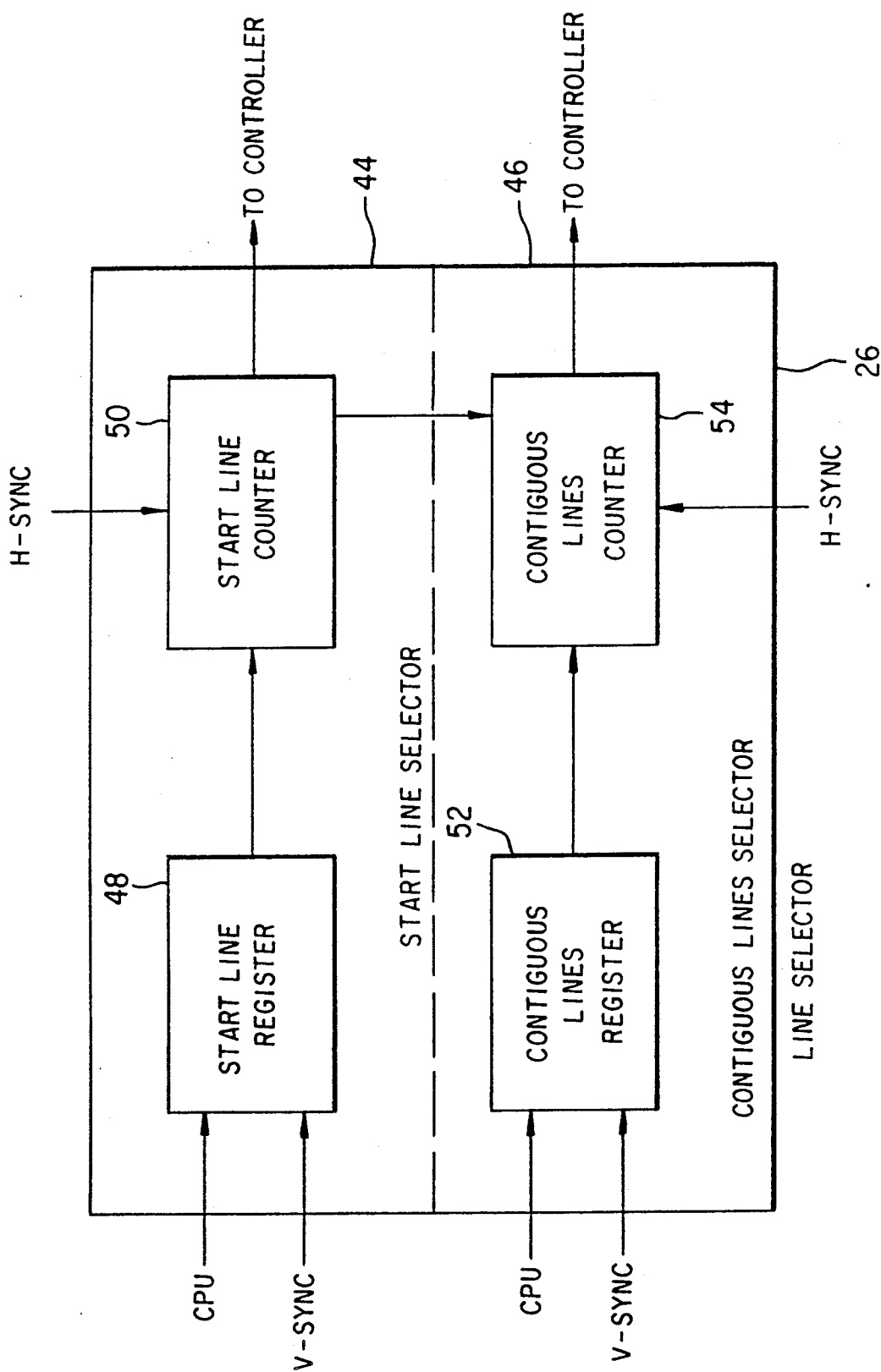
FIG. 4 is a detailed block diagram of a line selector in accordance with the present invention.

Line selector 26 comprises start line selector 44 and contiguous lines selector 46, separated by the dashed line in FIG. 4. Start line selector 44 comprises start line register 48 and start line counter 50. Contiguous line selector 46 comprises contiguous lines register 52 and contiguous lines counter 54. Start line counter 50 and contiguous lines counter 54 are preferably decrementing counters.

In operation, an operator identifies the first line to be collected in each image frame and inputs a corresponding value into start line register 48 through CPU 16. Similarly, the operator identifies how many lines of each video frame he or she wishes to digitize, starting with the start line, and inputs a corresponding value into contiguous lines register 52 through CPU 16. For example, if the video input signal comprises 525 lines of video information, and the operator chooses to digitize only lines 250–275, inclusive, the operator loads start line register 48 with the value 250 and loads contiguous lines register 52 with the value 26.

Both values are placed into their respective counters 50 and 54 at the beginning of each video frame by a V-sync signal. From the beginning of a video frame, start line counter 50 decrements its value in response to each H-sync signal. When the start line counter 50 reaches zero, it provides an output signal to controller 22 and to contiguous lines counter 54. The contiguous lines counter 54 decrements one count for each H-sync signal until it reaches zero and produces an output signal to controller 22. These two output signals enable controller 22 to enable the A/D converter 12 to digitize video lines 250 through 275 of each frame selected by the frame selector 24.

Figure 5:
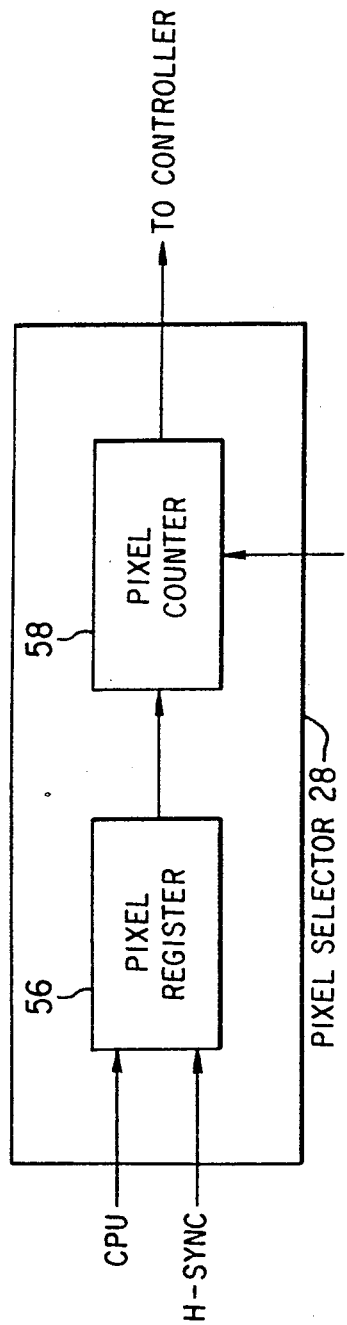
FIG. 5 is a detailed block diagram of a pixel selector in accordance with the present invention.

Also in accordance with the present invention, means is provided for variably selecting a predetermined number of pixels from each line of video information. As embodied herein, this means comprises pixel selector 28, which is shown in more detail in FIG. 5.

Pixel selector 28 comprises pixel register 56 and pixel counter 58. In operation, an operator identifies how many pixels from each line he or she wishes to digitize and inputs this value through CPU 16 into pixel register 56. This value is loaded into pixel counter 58 in response to each H-sync signal. Pixel counter 58 is preferably a decrementing counter, which decrements its count in response to pulses from an independent clock (not shown), and outputs an output signal to controller 22 when it reaches zero. The output signal from pixel counter 58 prevents the digitization of those pixels not selected by the operator. Each clock pulse corresponds to the selection of one pixel in a line of the image frame. Since pixel register 56 responds to H-sync signals, for the NTSC video format, the clock source must be capable of pulsing all pixels of a line in less than 63.5 μs.

Thus, in accordance with the present invention, a video selector is provided to select video information corresponding to a predetermined number of pixels of a predetermined number of lines in each of predetermined ones of a plurality of frames of video information until a predetermined total number of frames has been collected. As embodied herein, this video information is selected for digital conversion by an A/D converter.

Figure 6:
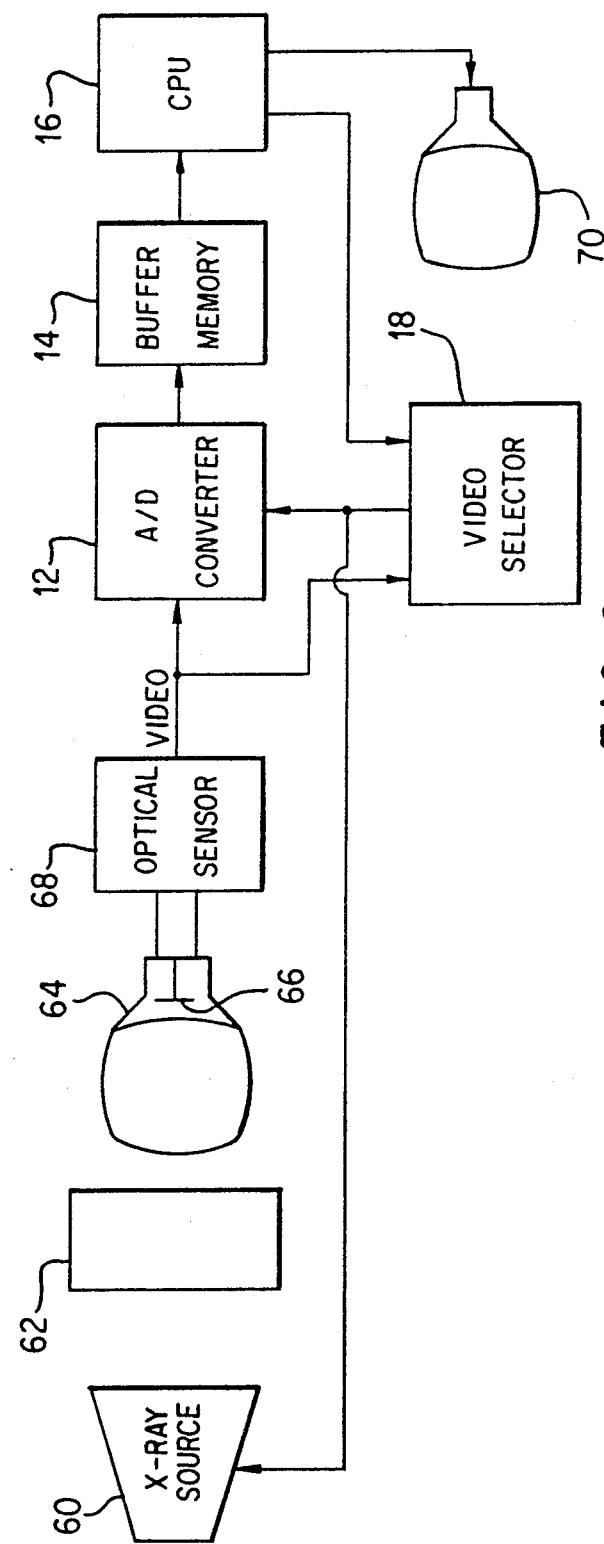
FIG. 6 is a block diagram a video selector in accordance with the present invention implemented in a computed tomography (CT) imaging system.

As discussed above, a preferred implementation for the present invention corresponds to a CT imaging system. Preferably, a CT imaging system such as that described in copending patent application bearing Ser. No. 07/593,659, filed on even date herewith and assigned to the same assignee as this application, the contents of which, is hereby incorporated by reference in its entirety. FIG. 6 is a block diagram of such a CT imaging system.

As shown in FIG. 6, an x-ray source 60 emits x-rays toward an object under test 62. X-rays passing through the object under test 62 are detected by an x-ray detector 64, which in a preferred embodiment, comprises an image intensifier to generate an image frame. The detected x-rays are focused on a phosphorus screen 66 of the image intensifier to generate an image frame. This image frame is scanned by an optical sensor 68 which, in a preferred embodiment is a T.V. camera, to produce a video signal. Typically, the object under test 62 is scanned for a period of 60 seconds, with 30 image frames being generated for each second of the scanning period. Thus, the object under test is irradiated with x-rays for a full 60 seconds. Again, if the object under test is a human being or an animal, this x-ray dose may be very dangerous.

In this example, each image frame comprises 525 lines of 512 data values. However, in CT imaging systems, only a thin slice of the object under test is used from each image frame to generate the slice image for display on display 70. For example, in copending patent application bearing Ser. No. 07/593,659, only 32 lines are used from the 525 lines of the image frame. Accordingly, the object under test 62 need not be irradiated with x-rays during the period of the scan corresponding to the generation of video lines outside the selected 32 lines. Further, if the operator selects only every five frames for digitization, the object under test 62 need not be irradiated with x-rays during the period of the scan corresponding to the generation of image frames in between the selected frames. Furthermore, if the operator selects a total number of frames which is less than the number of frames generated during the scanning period, the object under test 62 need not be irradiated with x-rays after the total number of frames has been collected.

Accordingly, in accordance with the present invention, means is provided for irradiating an object under test only at intervals of a scanning period corresponding to variably selected portions of a video signal.

As embodied herein, this means corresponds to the controller 22 of the video selector 18 and the x-ray source 60. The control signal output by the controller 22 is also applied to the x-ray source 60, which preferably comprises a grid controlled x-ray tube, to generate x-rays only during intervals of a scanning period corresponding to the selected video information. A grid controlled x-ray tube is not capable of responding to the selected video information at the pixel level, and responds only to the selected lines and frames of video information. In this manner, the object under test 62 is exposed to a significantly reduced amount of x-rays during the CT image scanning process.

While there has been illustrated and described what are at present considered to be preferred embodiments and methods of the present invention, it will be understood by those skilled in the art that various changes and modification may be made, and equivalents may be substituted for elements thereof without departing from the true scope of the invention. For example, the total frames selector, line selector and pixel selector are described herein as being implemented with decrementing counters. Alternatively, incrementing counters may be used and the count value compared is to the value stored in the corresponding register, similar to the implementation of the frame skip selector. Likewise, the frame skip selector may be implemented with a decrementing counter similar to the total frames selector, line selector and pixel selector. Other counter configurations which identify the desired pixel, lines and frames could also be implemented in the frame, lines and pixel selectors, in accordance with the invention.

As described herein, the preferred embodiment is implemented in a progressive scanning mode. However, the present invention also contemplates the selection of video information for interlaced video formats. In such an embodiment, provisions are made for properly sorting the interlaced video information in accordance with conventional techniques.

In addition, many modifications may be made to adapt a particular element, technique or implementation to the teachings of the present invention without departing from the central scope of the invention. Therefore, it is intended that this invention not be limited to the particular embodiments and methods disclosed herein, but that the invention include all embodiments falling within the scope of the appended claims.

What is claimed is:

1. An apparatus for collecting predetermined portions of a video signal including at least one frame of video information comprised of at least one line of pixels of video information, comprising:
   means for variably selecting a predetermined number of pixels from said at least one line of video information; and
   means for collecting video information corresponding only to said predetermined number of pixels in said at least one line of video information.

2. An apparatus according to claim 1, wherein said means for variably selecting a predetermined number of pixels from said at least one line of video information comprises:

register means for storing a value corresponding to said predetermined number of pixels;

counting means for counting between said value and zero, one count for each pixel of video information; and means for controlling said collecting means to collect video information from said at least one line until said counting means reaches zero.

3. An apparatus for collecting predetermined portions of a video signal, said video signal including at least one frame of video information comprised of a plurality of lines of video information, comprising:

means for variably selecting predetermined lines of said at least one frame of video information; and means for collecting video information corresponding only to said predetermined lines in said at least one frame of video information.

4. An apparatus according to claim 3, wherein said means for variably selecting predetermined lines of said at least one frame of video information comprises:

first register means for storing a first value corresponding to a first one of said predetermined lines;

second register means for storing a second value corresponding to a last one of said predetermined lines;

counting means for counting between said first and second values; and means for controlling said collecting means to collect video information from said at least one frame of video information only when said counting means counts between said first and second values.

5. An apparatus according to claim 3, further comprising:

means for variably selecting a predetermined number of pixels from each of said plurality of lines of video information; and means for collecting video information corresponding only to said predetermined number of pixels in each of said plurality of lines of video information.

6. An apparatus for collecting predetermined portions of a video signal including a plurality of frames of video information, comprising:

means for variably selecting predetermined ones of said plurality of frames of video information; and means for collecting video information corresponding only to said predetermined ones of said plurality of frames of video information.

7. An apparatus according to claim 6, wherein said means for variably selecting predetermined ones of said plurality of frames of video information comprises:

register means for storing a value corresponding to a number of frames to be skipped before collecting a frame of video information;

means for counting between zero and said value, one count for each of said plurality of frames of video information; and means for controlling said collecting means to collect video information from said video signal only when a count value in said counting means is equal to said value in said register means.

8. An apparatus according to claim 6, wherein each of said plurality of frames of video information comprises a plurality of lines of video information, and further comprising:

means for variably selecting predetermined lines of said plurality of frames of video information; and means for collecting video information corresponding only to said predetermined lines in each of said plurality of frames of video information.

9. An apparatus according to claim 8, further comprising means for variably selecting a predetermined number of pixels from each of said plurality of lines of video information; and means for collecting video information corresponding only to said predetermined number of pixels in each of said plurality of lines of video information.

10. An apparatus for collecting predetermined portions of a video signal, said video signal including a plurality of frames of video information, comprising:

means for variably selecting a predetermined total number of said plurality of frames of video information; and means for collecting video information corresponding to said plurality of frames of video information until said predetermined total number of frames has been collected.

11. An apparatus according to claim 10, wherein said means for variably selecting a predetermined total number of said plurality of frames of video information comprises:

register means for storing a value corresponding to said predetermined total number of said plurality of frames of video information;

counting means for counting between said value and zero, one count for each frame of said plurality of frames of video information; and means for controlling said collecting means to collect video information from said video signal only until said counting means reaches zero.

12. An apparatus for collecting predetermined portions of a video signal, said video signal including a plurality of frames of video information comprised of a plurality of lines of pixels of video information, comprising:

means for variably selecting a predetermined total number of said plurality of frames of video information;

means for variably selecting predetermined ones of said plurality of frames of video information;

means for variably selecting predetermined lines of each of said plurality of frames of video information;

means for collecting video information corresponding to said predetermined lines in each of said predetermined ones of said plurality of frames of video information until said predetermined total number of frames of video information has been collected.

13. An apparatus according to claim 12, further comprising:

means for variably selecting a predetermined number of pixels from each line of video information; and means for collecting video information corresponding to said predetermined number of pixels in each of said predetermined lines.

14. An apparatus according to claim 12, wherein said collecting means comprises an analog-to-digital converter.

15. A computed tomography (CT) x-ray imaging system, comprising:

means for variably selecting a portion of a video signal corresponding to an image frame of an object under test; and means for irradiating said object under test with x-rays only at intervals of a scanning period corresponding to the variably selected portions of said video signal.

16. A CT x-ray imaging system according to claim 15, wherein said means for variably selecting a portion of a video signal includes means for variably selecting a predetermined total number of a plurality of frames of video information.

17. A CT x-ray imaging system according to claim 15, wherein said means for variably selecting a portion of a video signal includes means for variably selecting predetermined ones of a plurality of frames of video information.

18. A CT x-ray imaging system according to claim 15, wherein said means for variably selecting a portion of a video signal includes means for variably selecting predetermined lines of each of a plurality of frames of video information.

19. A CT x-ray imaging system according to claim 15, wherein said means for irradiating said object under test comprises:
   means for generating a control signal at said intervals of a scanning period corresponding to said variably selected portions of said video signal; and
   means for generating x-rays in response to said control signal.

20. A method of collecting predetermined portions of a video signal, said video signal including a plurality of frames of video information comprised of a plurality of lines of pixels of video information, comprising the steps of:
   variably selecting a predetermined total number of said plurality of frames of video information;
   variably selecting predetermined ones of said plurality of frames of video information;
   variably selecting predetermined lines of each of said plurality of frames of video information; and
   collecting video information corresponding to said predetermined lines in each of said predetermined ones of said plurality of frames of video information until said predetermined total number of frames of video information has been collected.

21. A method according to claim 20, further comprising the steps of:
   variably selecting a predetermined number of pixels from each line of video information; and
   collecting video information corresponding to said predetermined number of pixels in each of said predetermined lines.

22. A method of controlling doses of x-rays during a scanning period in a computed tomography (CT) imaging system, comprising the steps of:
   variably selecting a portion of a video signal corresponding to at least one image frame of an object under test; and
   irradiating said object under test with x-rays only at intervals of a scanning period corresponding to the variably selected portions of said video signal.

23. A method according to claim 22, wherein said video signal includes a predetermined number of lines of video information having a predetermined number of pixels of video information; and
   wherein said step of variably selecting a portion of a video signal comprises the step of variably selecting a predetermined number of pixels from each line of video information.

24. A method according to claim 22, wherein said video signal includes a plurality of frames of video information, each including a predetermined number of lines of video information having a predetermined number of pixels of video information; and
   wherein said step of variably selecting a portion of a video signal comprises the step of variably selecting predetermined lines from each of said plurality of frames of video information.

25. A method according to claim 22, wherein said video signal includes a plurality of frames of video information, each including a predetermined number of lines of video information having a predetermined number of pixels of video information; and
   wherein said step of variably selecting a portion of a video signal comprises the step of variably selecting predetermined ones of said plurality of frames of video information.

26. A method according to claim 22, wherein said video signal includes a predetermined number of lines of video information having a predetermined number of pixels of video information; and
   wherein said step of variably selecting a portion of a video signal comprises the step of variably selecting a predetermined total number of said plurality of frames of video information.

* * * * *